United States Patent [19]

Richter

[11] 4,316,309
[45] Feb. 23, 1982

[54] TENTERING CLIP CHAIN

[75] Inventor: Hans H. Richter, Warwick, R.I.

[73] Assignee: Marshall and Williams Company, Providence, R.I.

[21] Appl. No.: 82,430

[22] Filed: Oct. 9, 1979

[51] Int. Cl.³ .............................................. D06C 3/04
[52] U.S. Cl. ...................................................... 26/93
[58] Field of Search ............................... 26/73, 89, 93

[56] References Cited

U.S. PATENT DOCUMENTS

| 3,142,108 | 7/1964 | Gageur | 26/93 |
| 3,234,621 | 2/1966 | Hyatt | 26/93 |
| 3,580,451 | 5/1971 | Fraitzl | 26/93 X |
| 4,134,189 | 1/1979 | Richter | 26/89 |

FOREIGN PATENT DOCUMENTS

| 1337600 | 8/1963 | France | 26/73 |
| 47-20269 | 9/1972 | Japan | 26/93 |

Primary Examiner—Robert Mackey
Attorney, Agent, or Firm—William Frederick Werner

[57] ABSTRACT

This invention relates to the bases of tentering clips pivotally connected to form an endless tentering chain and specifically to a structure wherein the sprocket rollers and the stress rollers are located upon the same shaft in vertical alignment.

4 Claims, 12 Drawing Figures

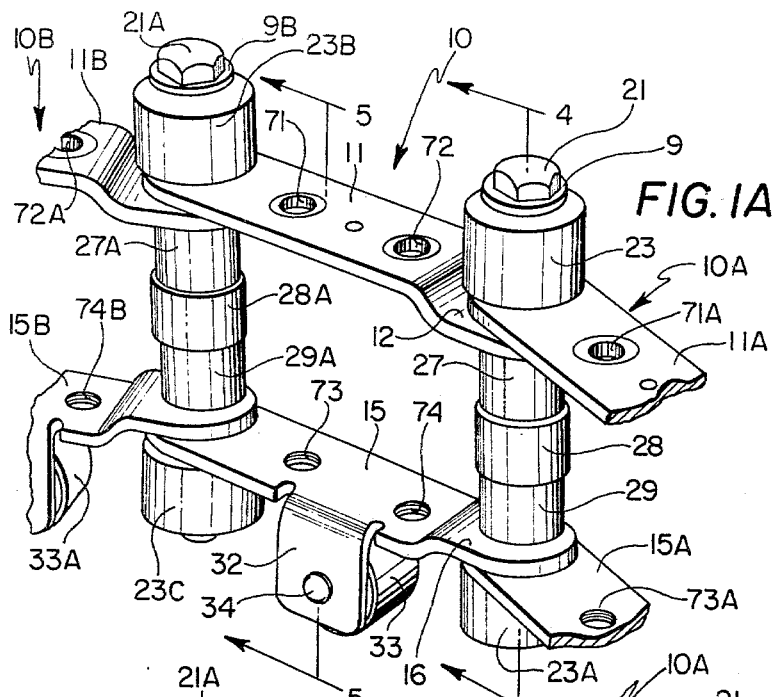
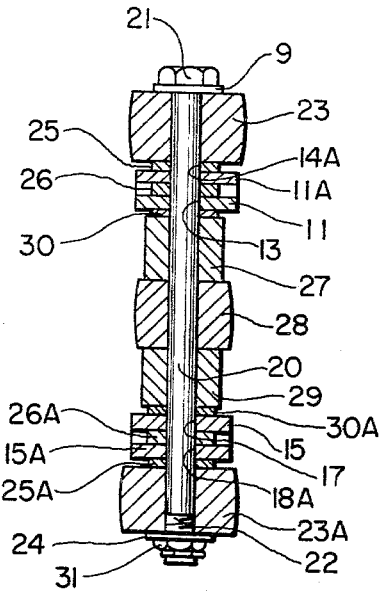
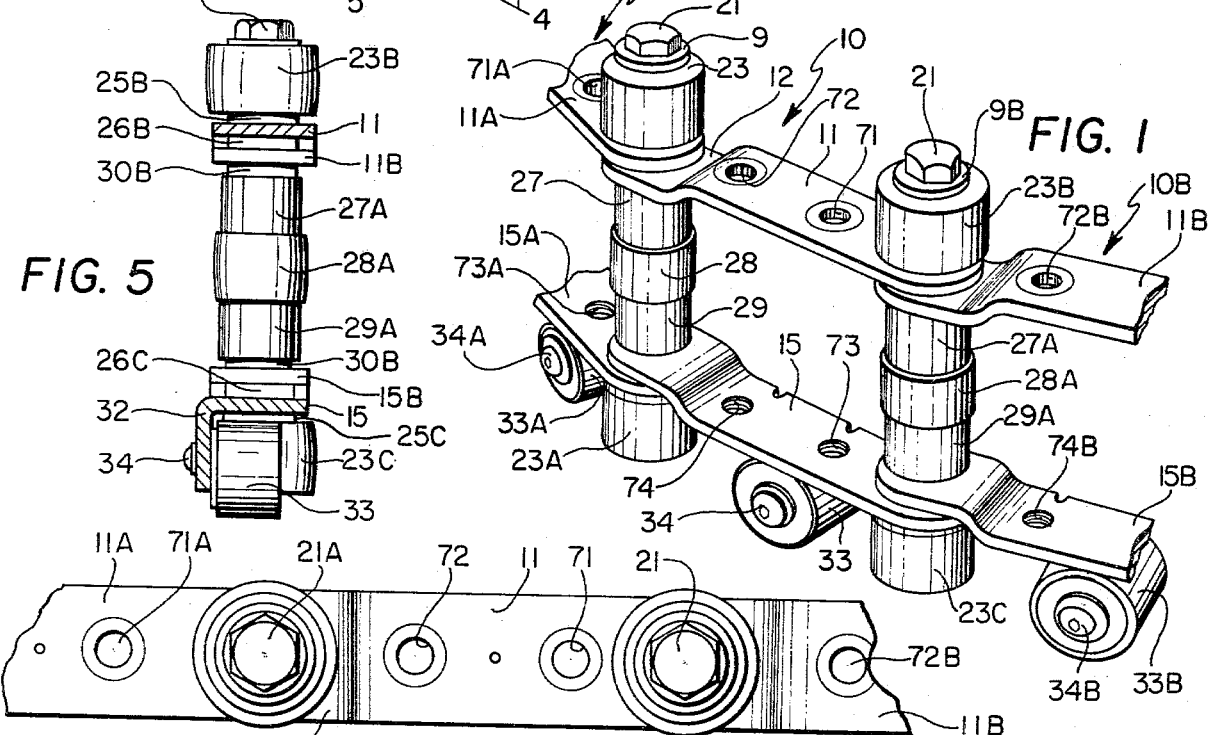
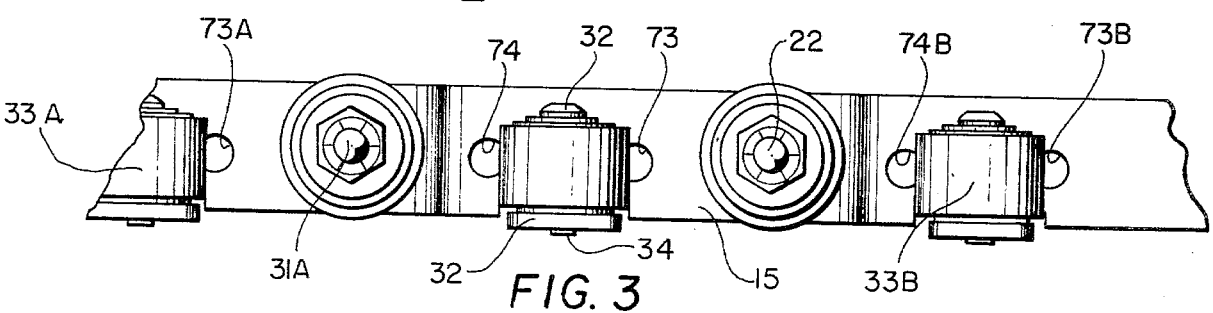

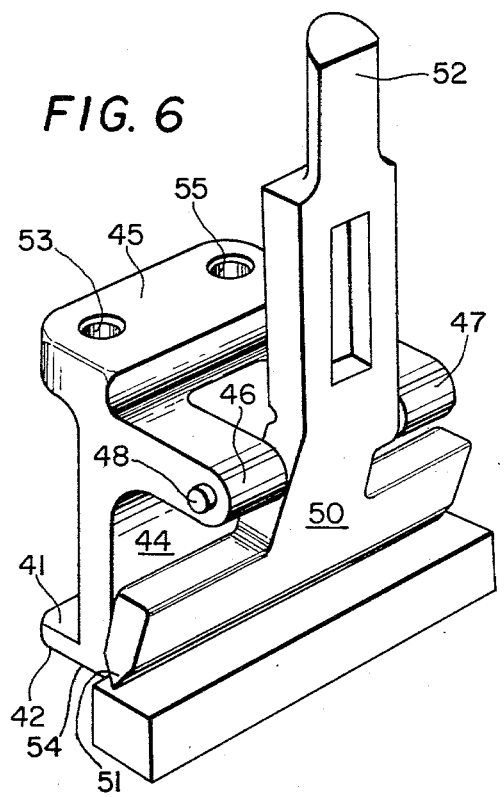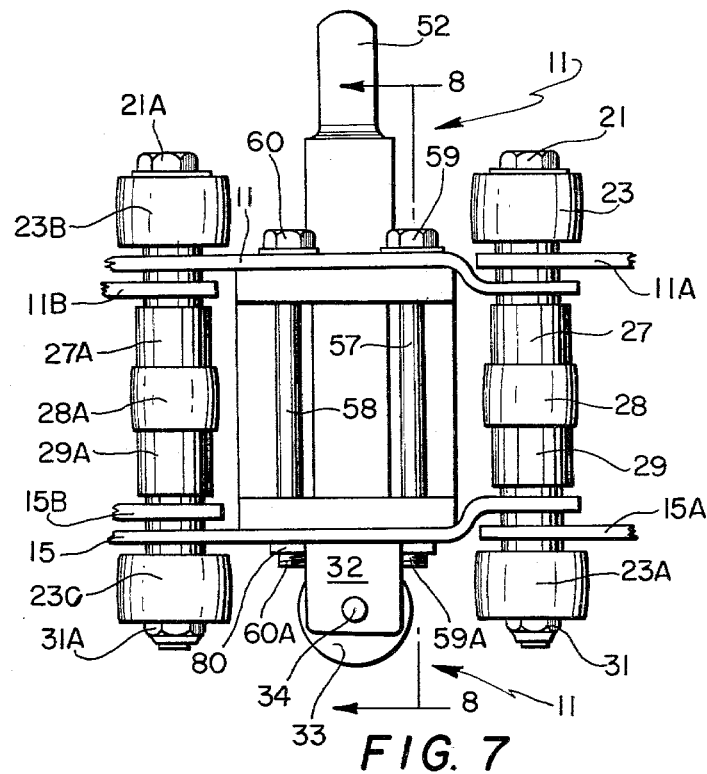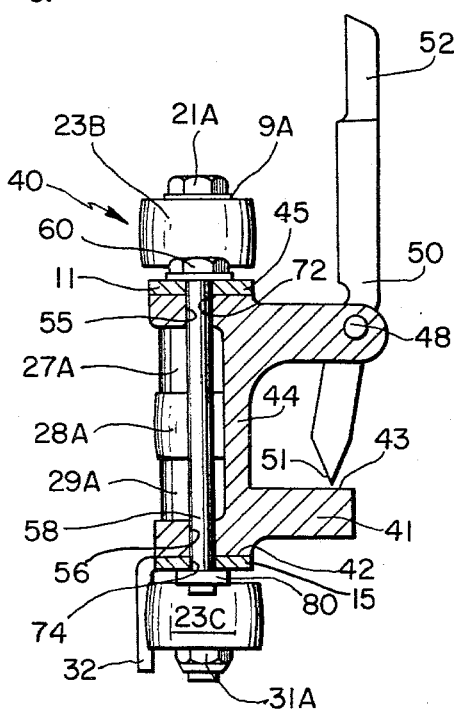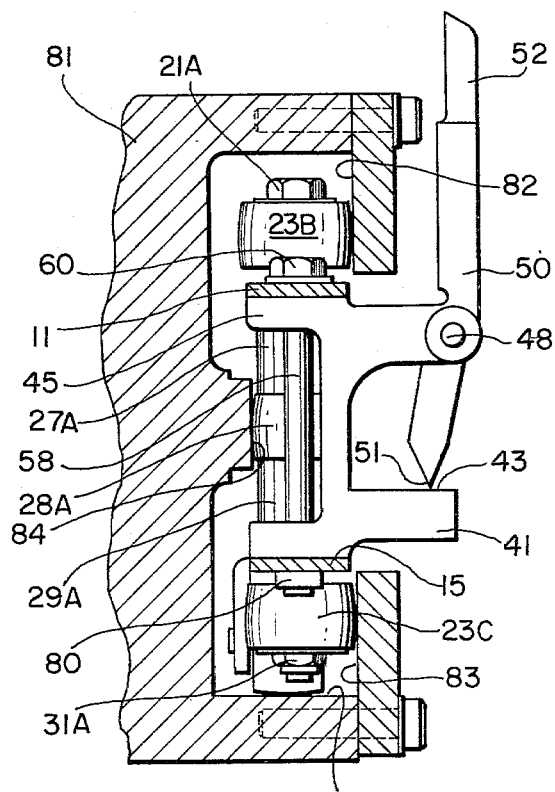

TENTERING CLIP CHAIN

STATEMENT OF INVENTION

The present invention relates to a new tentering clip base and more particularly to a tentering clip base structure wherein a plurality of sprocket rollers and a plurality of stress rollers are located in vertical alignment upon a single shaft with two such shafts located in opposite ends of a base structure.

BACKGROUND OF THE INVENTION

Advances made in the chemical composition of plastic film has produced film with new physical characteristics including resistance to lateral and longitudinal stretching. The lateral resistance of the plastic film produces increased stress upon the tentering clips, located on opposite sides of the tentering frame in endless chains, which stretch the film to reduce the film thickness.

The additional stress causes distortion between pivotally connected clips disclosed in the prior art. The distortion is due to the length of the distance between the plane in which the film is gripped and the plane passing through the point of contact of the stress rollers with the tentering frame rail face.

The problem presented is the need to increase the strength of both the tenter clip and the tenter base forming the tentering chain and reduce the space between adjacent clips to avoid juxtapositioning of adjacent clips. The further problem presented is the need to increase the strength of the drive sprocket which must pull a greater load due to the increased frictional contact of the stress rollers with the rail face. The cost of manufacture of the new and improved structure had to be held to a minimum.

The present invention is considered to be an improvement over U.S. Pat. Nos. 3,058,191, 3,580,451, 3,142,108, 3,638,289, 3,457,608, 3,748,704, 3,469,291, 4,134,189, 3,555,637, and French Pat. No. 1,337,600 dated Aug. 1963.

OBJECTS OF THE INVENTION

Accordingly, it is a principal object of the present invention to provide a tentering clip with a structure which is strong enough to withstand the constricting forces inherent in plastic sheeting while providing the structure with means to reduce the frictional forces between the tentering clip and rail face and to increase the contact area between the sprocket rollers and sprocket drive teeth.

Another object of the present invention is to provide a tentering clip structure with means to reduce the distance between adjacent clips and thereby eliminate scalloping, juxtapositioning and compression.

Still another object of the present invention is to provide roller bearings on opposite ends of a common shaft for engagement with the rail face and to provide two sprocket rollers intermediate between the two roller bearings upon the same common shaft. An anti-tipping roller is provided between the two sprocket rollers and located upon the common shaft.

And still another object of the present invention is to provide a tentering clip base comprising a linkage structure to reduce the distance between the vertical plane in which the film is gripped by the tenter clip jaw and the vertical plane passing through the common shaft.

A further object of the present invention is to provide a new base structure for a superstructure or tentering clip jaw and for the rapid substitution of a pin clip or another tentering clip jaw.

Other objects of the present invention will be pointed out in part and become apparent in part in the following specification and claims.

BRIEF DESCRIPTION OF THE DRAWINGS

Referring to the drawings in which similar characters of reference indicate corresponding parts:

FIG. 1 is a perspective view showing the front elevation of the new and improved tenter clip base adjacent fragmentary sections of adjoining base structures on opposite sides thereof;

FIG. 1A is a view similar to FIG. 1 showing the rear elevation thereof;

FIG. 2 is a plan view of FIG. 1;

FIG. 3 is a bottom view of FIG. 1;

FIG. 4 is a vertical cross sectional view taken on line 4—4 of FIG. 1A;

FIG. 5 is a vertical cross sectional view taken on line 5—5 of FIG. 1A;

FIG. 6 is a perspective view of one form of tentering clip jaw adapted to be mounted upon the new and improved tentering clip base;

FIG. 7 is a rear elevational view of the tentering clip jaw connected to the new and improved tentering clip base;

FIG. 8 is a vertical cross sectional view taken upon line 8—8 of FIG. 7;

FIG. 11 is a vertical sectional view taken through the tentering frame rail showing the new and improved tentering clip mounted for rotation therein.

THE SPECIFICATION

Figure 9:
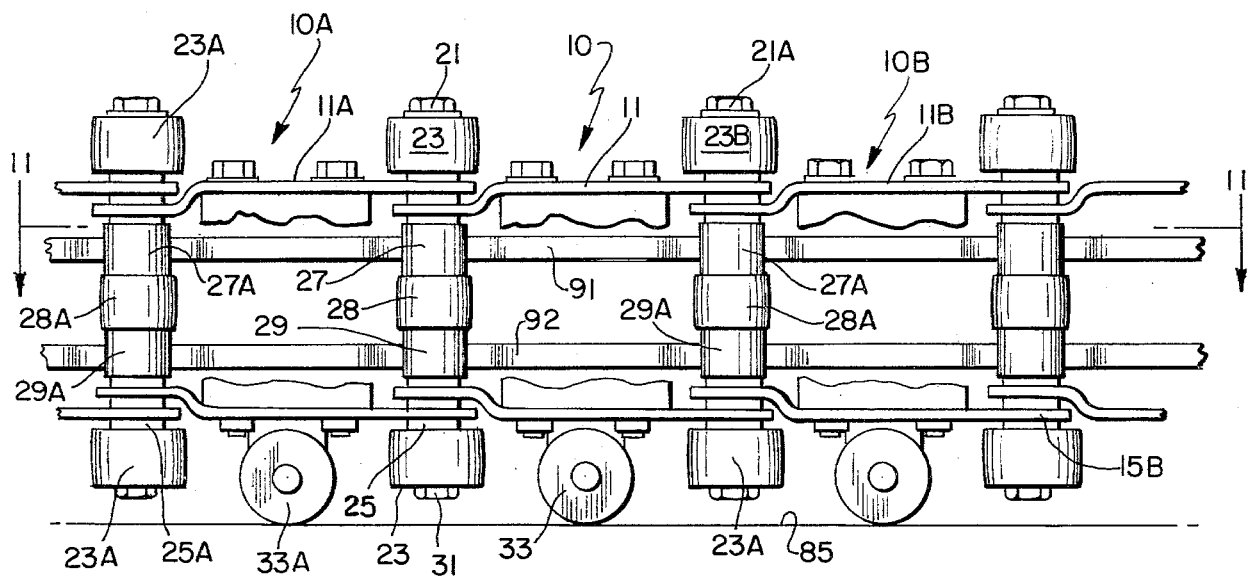
FIG. 9 is a front elevational view of the new and improved tentering clip bases connected together to form a tentering clip chain; with the tentering clip jaws shown fragmentarily connected, respectively, to the tentering clip bases.

Referring to the drawings and especially FIGS. 1, 1A, 2, 3, 4 and 5, the new and improved tentering clip comprises a base, generally indicated by reference numeral 10, comprising a horizontal upper bracket 11, having a downward offset 12, with apertures 13, in opposite ends, and a horizontal lower bracket 15 having an upward offset 16 with apertures 17, in opposite ends. A bolt 20 having a head 21 and a threaded end 22, has an upper stress roller 23 rotatably mounted thereon with a washer 9 between head 21 and roller 23. The bolt 20 is passed through aperture 14A in bracket 11A of the adjacent base with an upper wear washer 25 interposed between upper stress roller 23 and upper bracket 11A. Bolt 20 is then passed through orifice 13 in horizontal upper bracket 11 with an upper separating washer 26 mounted upon bolt 20 and interposed between brackets 11, 11A. An upper sprocket roller 27, an anti-tipping roller 28 and a lower sprocket roller 29 are rotatably mounted upon bolt 20 in that sequence with upper spacing washer 30 mounted on bolt 20 between bracket 11 and upper sprocket roller 27. Bolt 20 is then passed through aperture 17 in horizontal lower bracket 15 and aperture 18A in bracket 15A of the adjacent base 10A with lower spacing washer 30A mounted upon bolt 20 and interposed between lower sprocket roller 29 and horizontal lower bracket 15; and with lower spacing washer 26A mounted upon bolt 20 and interposed between lower brackets 15, 15A. A lower stress roller 23A provided with a seat 24 is rotatably mounted upon bolt 20 with a lower wear washer 25A mounted upon bolt 20 and interposed between lower bracket 15A and lower stress roller 23A. A nut 31 rotatably mounted upon threaded end 22 and against seat 24 secures said rollers and washers to bolt 20.

In like manner, base 10B is attached to base 10; an upper stress roller 23B, horizontal upper brackets 11 and 11B, a washer 9B between head 21A and roller 23B, upper wear washer 25B, upper separating washer 26B, upper spacing washer 30B, upper sprocket roller 27A, anti-tipping roller 28A, lower sprocket roller 29A, lower spacing washer 30B, horizontal lower brackets, 15B, 15, lower separating washer 26C, wear washer 25C and lower stress roller 23C are all mounted upon a companion to bolt 20, having a head 21A and a nut 31A.

Horizontal lower bracket 15 is provided with a depending arm 32 at right angles thereto. A base support roller 33 is rotatably attached to arm 32 by means of a pintle 34 fastened to arm 32.

Thus it will be seen that a new and improved tentering clip base 10 is in being. Reference is now made to FIGS. 6, 7, 8, 9 and 11 where a new and improved superstructure or tentering clip jaw 40 is illustrated. It comprises a horizontally disposed bottom 41 having a seat 42, a gripping surface 43, an upstanding wall 44 and a top 45 overlying said seat 42. A pair of spaced apart arms 46, 47 project sidewise from said upstanding wall 44 to overlie said gripping surface 43. A shaft 48 is fastened on opposite ends in said pair of arms 46, 47. Pivotally mounted upon shaft 48 is a jaw 50 having a gripping edge 51 at the lower end and an upstanding leg 52 at the upper end. Material to be tentered is gripped between said gripping edge 51 and gripping surface 43. Two sets of aligned bores 53, 54 (not shown) and 55, 56 located, respectively, in top 45 and bottom 41. Two rods 57, 58 having, respectively, heads 59, 60 on one end and threaded portions (59A, 60A) on the lower end fasten superstructure 40 to base 10, as will presently appear.

Horizontal upper bracket 11 is provided with two apertures 71, 72. Horizontal lower bracket 15 is provided with two taped holes 73, 74 aligned, respectively, with apertures 71, 72.

In attaching the superstructure 40 to base 10, seat 42 is placed upon horizontal lower bracket 15 with top 45 underlying horizontal upper bracket 11. Bores 53, 55 are aligned with apertures 71, 72 respectively. Rod 57 is passed through aperture 71, bore 53, bore 54 and taped hole 73 to rotatively engage the threads to fasten superstructure 40 to base 10.

In like manner, rod 58 is passed through aperture 72, bore 55, bore 56 and tapered hole 74 to rotatively engage the threads to fasten superstructure 40 to base 10. A lock washer 80 may be attached to the threads to prevent rotational displacement of rod 58 from the threads.

FIG. 11 illustrates, in cross section, a tentering machine rail 81 having an upper front rail face 82, a lower front rail face 83, a rear rail face 84, and a lower track 85.

FIG. 9 is a front elevational view of tenter clip bases 10, 10A, 10B, etc., pivotally connected together by means of horizontal upper brackets 11, 11A, 11B, etc., and horizontal lower brackets 15, 15A, 15B, etc. with the upstanding walls 44 of superstructures 40 broken away for clarity, to illustrate a fragmentary section of an enclosed tenter chain.

Figure 10:
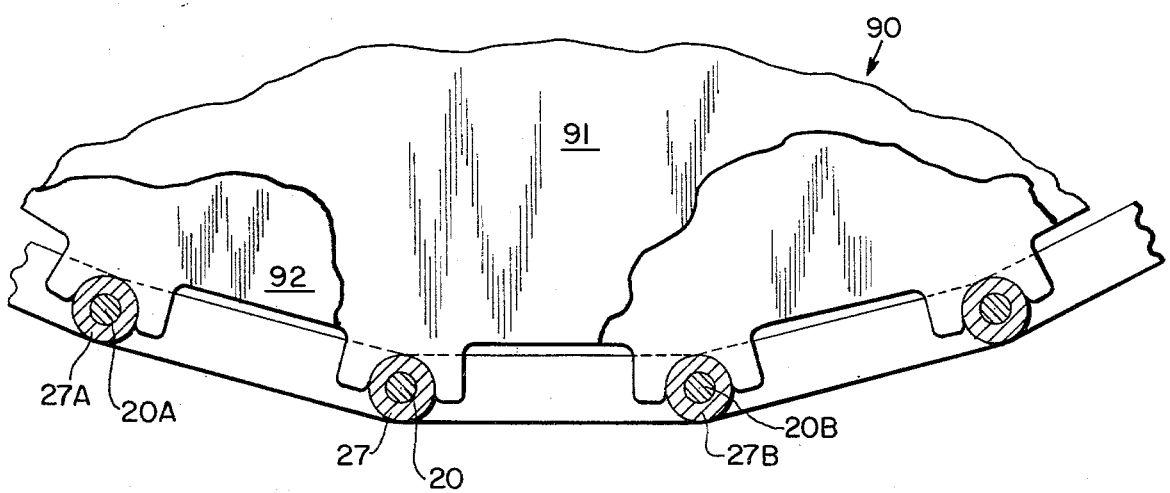
FIG. 10 is a fragmentary plan view of the tentering clip sprocket teeth engaging the tentering clip sprocket rollers, taken on line 11—11 of FIG. 9.

FIG. 10 is a fragmentary plan view of the tentering clip sprocket 90 having two separate horizontal layers of sprocket teeth 91, 92 engaging upper sprocket rollers 27A and lower sprocket rollers 29.

In operation, upper stress roller 23B will ride against upper front rail face 82, and lower stress roller 23C will ride against lower front rail face 83. The clip support roller 33 will ride upon lower track 85. Anti-tipping rollers 28, 28A will not engage rear rail face 84 when the superstructure 40 is in the material gripped or working cycle because the material being gripped on opposite edges by the oppositely located superstructures 40 will be drawn toward each other under the stress or resistance to stretching of the material. On the nonworking or return cycle anti-tipping rollers 28, 28A are free to engage rear rail face 84 as the lack of stress loosens the tentering chain during the non-working cycle.

Having shown and described a preferred embodiment of the present invention by way of example, it should be realized that structural changes could be made and other examples given without departing from either the spirit or scope of this invention.

What I claim is:

1. A tentering clip chain comprising a plurality of tenter clip bases pivotally connected together, each base comprising a horizontal upper bracket and a horizontal lower bracket, a first bolt provided with a first set of five rollers consisting of an upper stress roller, an upper sprocket roller, an anti-tipping roller, a lower sprocket roller and a lower stress roller, means securing said bolt in said horizontal upper bracket and said horizontal lower bracket, a second bolt provided with a second set of five rollers consisting of an upper stress roller, an upper sprocket roller, an anti-tipping roller, a lower sprocket roller and a lower stress roller, means securing said second bolt in said horizontal upper bracket and said horizontal lower bracket, a horizontal upper bracket and a horizontal lower bracket of an adjacent base being pivotally connected to said first bolt and a horizontal upper bracket and a horizontal lower bracket of an adjacent base being pivotally connected to said second bolt on the side of said base opposite to said first mentioned adjacent base, a plurality of web-retaining superstructures, one for each said plurality of tenter clip bases, said superstructures located intermediate each base and the bolts thereof, means fastening said superstructure, to the respective, horizontal upper bracket and horizontal lower bracket, said upper bracket and said lower bracket being separate entities joined solely through said first bolt and said second bolt passing therethrough.

2. A device as set forth in claim 1 wherein each superstructure comprises a horizontally disposed bottom having a seat, a gripping surface, an upstanding wall and a top overlying said seat, a pair of spaced apart arms projecting sidewise from said upstanding wall to overlie said gripping surface, a shaft fastened on opposite ends in said pair of arms, a jaw having a gripping edge at the lower end and an upstanding leg at the other end, said jaw being pivotally mounted to said shaft.

3. A tentering clip chain comprising a plurality of tenter clip bases pivotally connected together, each base comprising a horizontal upper bracket and a horizontal lower bracket, a bolt provided with a first set of five rollers consisting of an upper stress roller, an upper sprocket roller, an anti-tipping roller, a lower sprocket roller and a lower stress roller, means securing said bolt in said horizontal upper bracket and said horizontal lower bracket, a second bolt provided with a second set of five rollers consisting of an upper stress roller, an upper sprocket roller, an anti-tipping roller, a lower sprocket roller and a lower stress roller, means securing said second bolt in said horizontal upper bracket and said horizontal lower bracket, a horizontal upper bracket and a horizontal lower bracket of an adjacent base being pivotally connected to said first mentioned bolt, and a horizontal upper bracket and a horizontal lower bracket of an adjacent base being pivotally connected to said second bolt on the side of said base opposite to said first mentioned adjacent base, a plurality of superstructures, one for each base, each superstructure comprising a horizontally disposed bottom having a seat, a gripping surface, an upstanding wall and a top overlying said seat, a pair of spaced apart arms projecting sidewise from said upstanding wall to overlie said gripping surface, a shaft fastened on opposite ends in said pair of arms, a jaw having a gripping edge at the lower end and an upstanding leg at the other end, said jaw being pivotally mounted to said shaft and means fastening said superstructure to a base comprising said horizontal upper bracket provided with a first aperture and a second aperture, said horizontal lower bracket provided with a first taped hole and a second taped hole, a first aligned bore in said top and bottom, a second aligned bore in said top and bottom, said seat engaging said horizontal lower bracket, said top engaging said horizontal upper bracket, a first rod having a thread on one end and a head on the other end passing through said first aperture, said first aligned bore and fastened in said first taped hole, with said head engaging said horizontal upper bracket, a second rod having a thread on one end and a head on the other end, passing through said second aperture, said second aligned bore and fastened in said second taped hole, whereby said superstructure is secured to said base.

4. A tentering clip chain comprising a plurality of tenter clip bases pivotally connected together, each base comprising a horizontal upper bracket, and a horizontal lower bracket, a bolt having a head and provided with a first set of five rollers, means securing said bolt in said horizontal upper bracket and said horizontal lower bracket, a second bolt having a head and provided with a second set of five rollers, a second means securing said second bolt in said horizontal upper bracket and said horizontal lower bracket, the horizontal upper bracket and a horizontal lower bracket of an adjacent base being pivotally connected to said first mentioned bolt, and the horizontal upper bracket and a horizontal lower bracket of an adjacent base being pivotally connected to said second bolt on the side of said base opposite to said first mentioned adjacent base, one of said first set of five rollers being an upper stress roller located between said first mentioned bolt head and a horizontal upper bracket, another of said first set of five rollers being a lower stress roller located on the lower end of said first mentioned bolt, an upper sprocket roller, an anti-tipping roller and a lower sprocket roller located on said first mentioned bolt between said horizontal upper bracket and said horizontal lower bracket, one of said second set of five rollers being an upper stress roller located between said second mentioned bolt head and said horizontal upper bracket, another of said second set of five rollers being a lower stress roller located on the lower end of said second mentioned bolt, an upper sprocket roller, an anti-tipping roller and a lower sprocket roller located on said second mentioned bolt between said horizontal upper bracket and said horizontal lower bracket, and a base support roller, a third means to rotatably fasten said base support roller to said horizontal lower bracket, a plurality of web-retaining superstructures, one for each said plurality of tenter clip bases, said superstructures located intermediate each base and the bolts thereof, means fastening said superstructure, to the respective, horizontal upper bracket and horizontal lower bracket, said upper bracket and said lower bracket being separate entities joined solely through said first bolt and said second bolt passing therethrough.

* * * * *